(12) United States Patent
Sugiyama et al.

(10) Patent No.: US 6,392,723 B1
(45) Date of Patent: May 21, 2002

(54) FLAT DISPLAY DEVICE WITH SUBSTANTIALLY RECTANGULAR BEZEL

(75) Inventors: Mamiko Sugiyama; Takaharu Matsuoka, both of Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 09/598,051

(22) Filed: Jun. 21, 2000

(30) Foreign Application Priority Data

Jun. 29, 1999 (JP) ............................................. 11-183217

(51) Int. Cl.[7] ............................................ G02F 1/1333
(52) U.S. Cl. ....................................................... 349/58
(58) Field of Search ............................. 349/58, 62, 64, 349/65; 361/681, 682; 345/87, 905; 312/223.2; 248/919; 362/26, 31, 559, 561

(56) References Cited

U.S. PATENT DOCUMENTS

| | | | |
|---|---|---|---|
| 5,422,751 A | * 6/1995 | Lewis et al. | 359/83 |
| 5,666,172 A | * 9/1997 | Ida et al. | 349/58 |
| 6,128,183 A | * 10/2000 | Uchiyama et al. | 361/681 |
| 6,220,741 B1 | * 4/2001 | Kawachi et al. | 362/561 |

FOREIGN PATENT DOCUMENTS

| | | | |
|---|---|---|---|
| JP | 2-39127 | * | 2/1990 |
| JP | 10-246881 | * | 9/1998 |
| JP | 11-95214 | * | 4/1999 |

OTHER PUBLICATIONS

IBM Tech.Disclosure Bulletin, Sep. 1993, vol. 36, Issue#9B pp. 435–438.*
IBM Tech.Disclosure Bulletin, Sep. 1995, vol. 38, Issue #9, pp. 379–380.*
IBM Tech, Bulletin, Jun. 1995, vol. 38, Issue #6, pp. 285–286.*

* cited by examiner

Primary Examiner—Akm E. Ullah
(74) Attorney, Agent, or Firm—Pillsbury Winthrop LLP

(57) ABSTRACT

A liquid crystal display device comprises a liquid crystal display panel and a surface light source unit that are built up on a resin frame. A rectangular metallic bezel is joined to the frame so that the display panel and the light source unit are held between the frame and the bezel. The bezel is joined to the frame in a manner such that its one long side portion is fitted in its corresponding long side portion of the frame and the other long side portion in engagement with its corresponding long side portion of the frame.

4 Claims, 3 Drawing Sheets

FLAT DISPLAY DEVICE WITH SUBSTANTIALLY RECTANGULAR BEZEL

CROSS-REFERENCE TO RELATED APPLICATIONS

This application is based upon and claims the benefit of priority from the prior Japanese Patent Application No. 11-183217, filed Jun. 29, 1999, the entire contents of which are incorporated herein by reference.

BACKGROUND OF THE INVENTION

The present invention relates to flat display devices represented by liquid crystal display devices, and more particularly, to a flat display device with a substantially rectangular metallic bezel.

Modern flat display devices, which are represented by liquid crystal display devices, are thin, light in weight, and highly power-efficient. Taking advantage of these features, they are utilized as various display devices for TV sets, computers, car navigation systems, etc.

In general, a liquid crystal display device of the light transmission type, for example, comprises a liquid crystal display panel, which includes a liquid crystal layer held between a pair of substrates, and a surface light source unit put on one surface of the display panel. The liquid crystal display panel and the surface light source unit are placed on a substantially rectangular resin frame. Overlying the display panel, a metallic bezel in the form of a rectangular frame is attached to the resin frame. Thus, the display panel and the light source unit are held between the frame and the bezel.

A typical method for fixing the bezel to the resin frame combines screwing and fitting or engagement. A tape is used jointly with these measures in order to maintain the strength of attachment.

Modern flat display devices are expected to be thinner and lighter in weight, and both the resin frame and the metallic bezel have a tendency toward thinness. In the case where the conventional fixing method includes fitting, the resin frame for strengthening the whole structure of the device should be somewhat thick-walled. As mentioned before, however, the resin frame is becoming too thin to secure satisfactory strength. If the resin frame is thin-walled, therefore, a tape is used to maintain its strength. However, the use of the tape lowers the efficiency of assembly operation and repairability.

In the case where the resin frame and the metallic are fixed by engagement, on the other hand, part of the bezel is normally bent and caused to engage the frame. If the bezel is too thin, the reusability of the bent metal is poor. Thus, the bent portion may be broken with high possibility when it is forced to be restored, so that the device cannot be repaired with ease.

BRIEF SUMMARY OF THE INVENTION

The present invention has been contrived in consideration of these circumstances, and its object is to provide a flat display device capable of being reduced in weight and thickness and enjoying improved repairability and higher efficiency of operation for fixing a metallic bezel and a resin frame together.

In order to achieve the above object, a flat display device according to the present invention comprises a substantially rectangular flat display panel having an effective display region, a substantially rectangular frame carrying the flat display panel thereon, and a bezel in the form of a substantially rectangular frame having an opening corresponding to the effective display region of the flat display panel and attached to the frame so that the display panel is held between the frame and the bezel. The frame has an engaging projection on one of two opposite side walls and a fitting lug on the other side wall. The bezel has an engaging portion engaging the engaging projection in a bent state and a fitting hole fitted with the fitting lug.

Another flat display device according to the invention comprises a substantially rectangular flat display panel having an effective display region, a substantially rectangular surface light source unit opposed to the flat display panel, a substantially rectangular frame carrying the flat display panel and the surface light source unit thereon, and a bezel in the form of a substantially rectangular frame having an opening corresponding to the effective display region of the flat display panel and attached to the frame so that the display panel and the light source unit are held between the frame and the bezel. The frame has an engaging projection on one of two opposite side walls and a fitting lug on the other side wall. The bezel has an engaging portion engaging the engaging projection in a bent state and a fitting hole fitted with the fitting lug.

According to each liquid crystal display device constructed in this manner, the frame and the bezel are joined together in a manner such that the projections and the engaging portions are individually in engagement with one another on the one side wall side and that the lugs are fitted individually in the fitting holes on the other side wall side. Thus, the frame and the bezel can be securely fixed to each other without using a tape or the like, so that the resulting display device enjoys reduced weight and thickness as well as improved efficiency of assembly operation and repairability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display device according to an embodiment of the present invention will now be described in detail with reference to the accompanying drawings.

Figure 1:
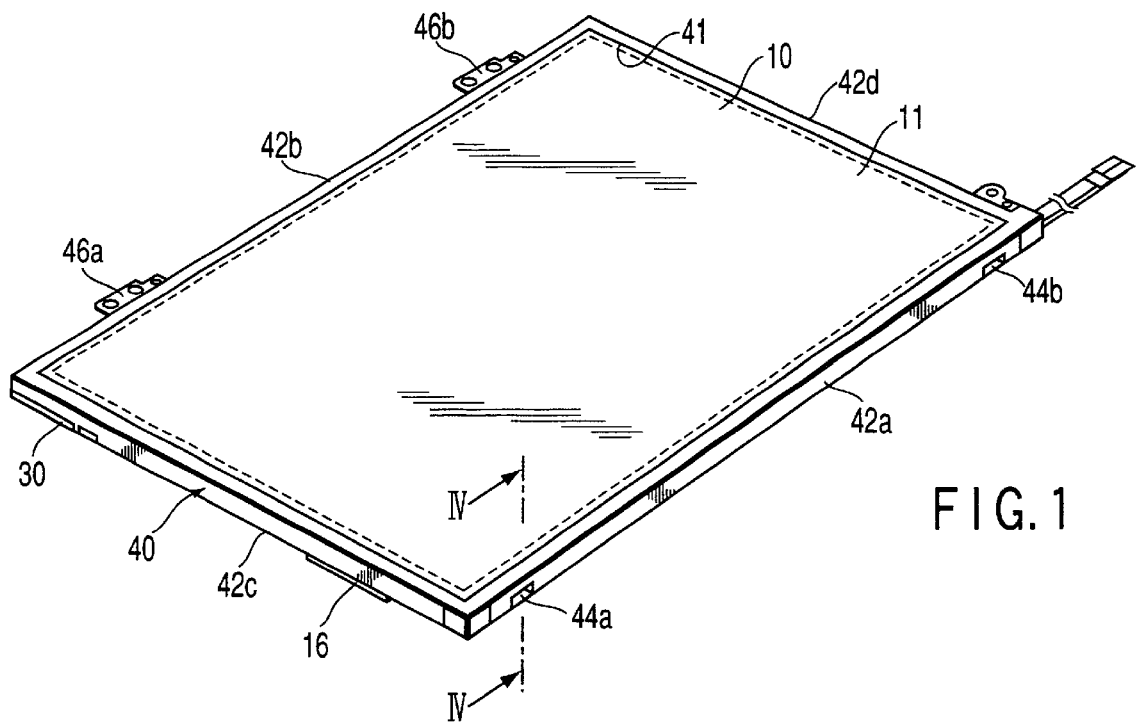
FIG. 1 is a perspective view showing a liquid crystal display device according to an embodiment of the present invention.
Figure 2:
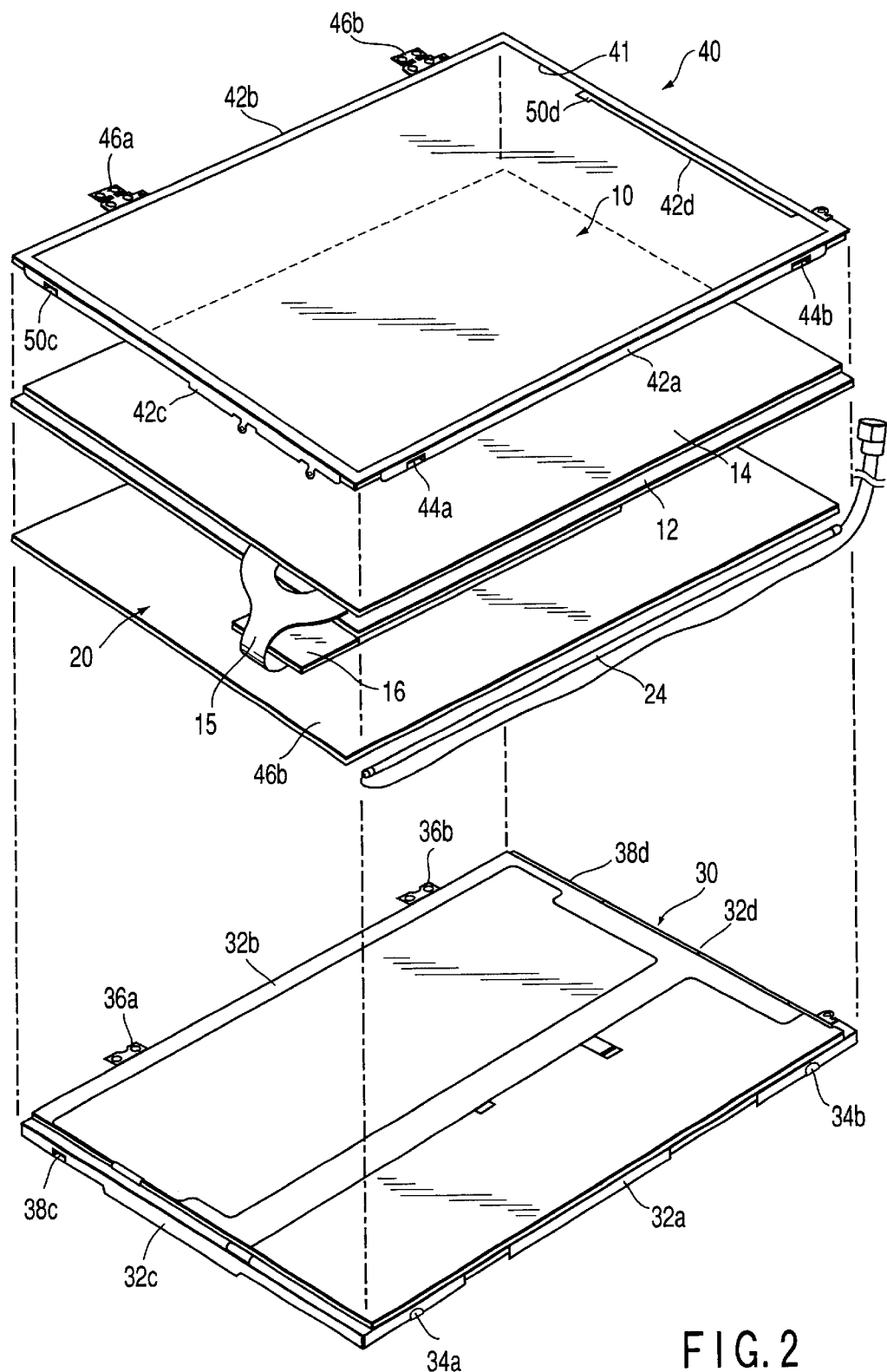
FIG. 2 is an exploded perspective view of the display device.

As shown in FIGS. 1 and 2, the liquid crystal display device comprises a rectangular liquid crystal display panel 10, having an effective display region with a diagonal dimension of 11.3 inches, and a substantially rectangular surface light source unit 20 put on the back surface of the panel 10. The liquid crystal display panel 10 and the surface light source unit 20 are placed on a substantially rectangular resin frame 30.

The liquid crystal display panel 10 is provided with a rectangular array substrate 12, an opposite substrate 14, a liquid crystal layer (not shown) sealed up between the substrates, etc. A large number of display pixels, switching elements, wires, and driver circuits (not shown) are formed on the array substrate 12. The substrate 12 has an effective display region 11 indicated by broken line in FIG. 1. Further, a driver circuit board 16 is connected to the array substrate 12 through a flat cable 15. The circuit board 16 is located on the back surface of the surface light source unit 20.

The surface light source unit 20, which is of the side-edge type, comprises a rectangular light guide plate 22 of acrylic resin, a tubular light source 24 opposed to one side edge of the plate 22, optical sheets (not shown), etc.

The surface light source unit 20 and the liquid crystal display panel 10 are placed on a rectangular frame 30 of synthetic resin. A metallic bezel 40 in the form of a rectangular frame is put on the peripheral edge portion of the panel 10 and joined to the frame 30. Thus, the display panel 10 and the light source unit 20 are held between the frame 30 and the bezel 40. The bezel 40 is formed of a stainless-steel sheet of 0.2-mm thickness.

The metallic bezel 40 is joined to the frame 30 in a manner such that its one long side portion is fitted in its corresponding long side portion of the resin frame 30 and the other long side portion in engagement with its corresponding long side portion of the frame 30. Further, the bezel 40 has a rectangular opening 41 that corresponds to the effective display region 11 of the liquid crystal display panel 10.

Figure 3:
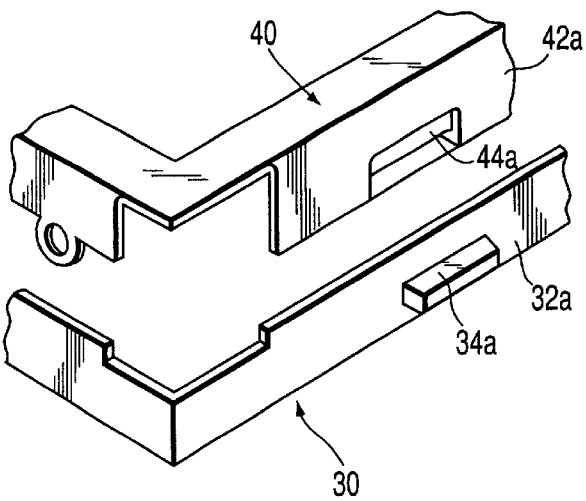
FIG. 3 is an enlarged exploded perspective view showing fitting portions of a frame and a bezel of the display device.
Figure 4:
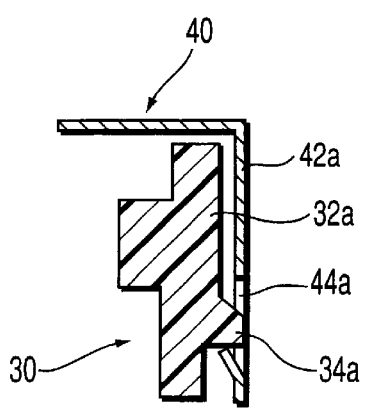
FIG. 4 is a sectional view taken along line IV—IV of FIG. 1.

More specifically, the frame 30 has a pair of opposite long side walls 32a and 32b and a pair of opposite short side walls 32c and 32d, as shown in FIGS. 2 to 4. Likewise, the bezel 40 has a pair of opposite long side walls 42a and 42b and a pair of opposite short side walls 42c and 42d.

Fitting lugs 34a and 34b are formed integrally on the one side wall 32a of the frame 30, protruding individually outward from the longitudinally opposite end portions thereof. Correspondingly, substantially rectangular fitting holes 44a and 44b are formed individually in the longitudinally opposite end portions of the one long side wall 42a of the metallic bezel 40. In joining the bezel 40 to the frame 30, the lugs 34a and 34b of the frame 30 are fitted into the fitting holes 44a and 44b of the bezel 40, respectively.

Figure 5:
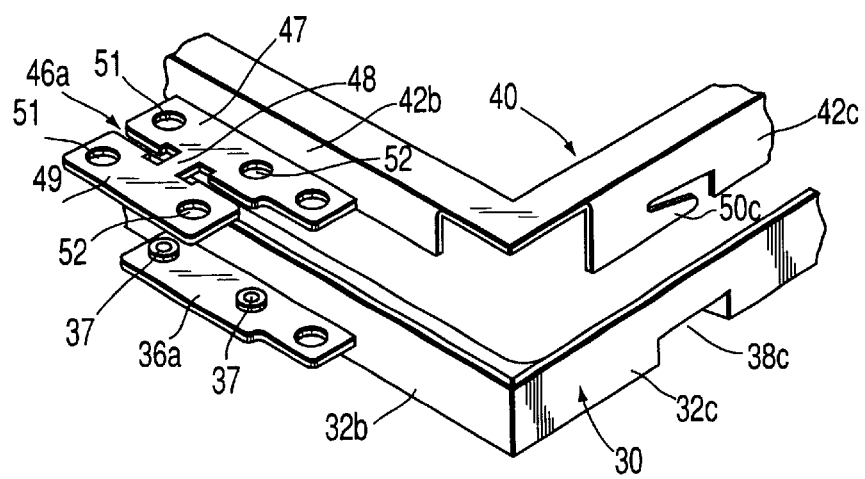
FIG. 5 is an enlarged exploded perspective view showing engaging portions and fitting portions of the frame and the bezel of the display device.

As shown in FIGS. 2 and 5, moreover, platelike fitting projections 36a and 36b are formed integrally on the other long side wall 32b of the frame 30, protruding individually outward from the longitudinally opposite end portions thereof. The projections 36a and 36b are used when the liquid crystal display device is screwed to an external device. A pair of tapped holes 37 are formed in each of the projections 36a and 36b.

Corresponding to the projections 36a and 36b of the frame 30, engaging portions 46a and 46b, in the form of a substantially rectangular plate each, are formed on the other long side wall 42b of the bezel 40, protruding individually outward from the longitudinally opposite end portions thereof. Each of the engaging portions 46a and 46b is provided integrally with a flat base portion 47, corresponding to each of the projections 36a and 36b, and a turn-up portion 49 coupled to the base portion by means of an elongate junction 48. Through holes 51 and 52 corresponding to the tapped holes 37 of the projection 36a or 36b are formed in both the base portion 47 and the turn-up portion 49.

Figure 6:
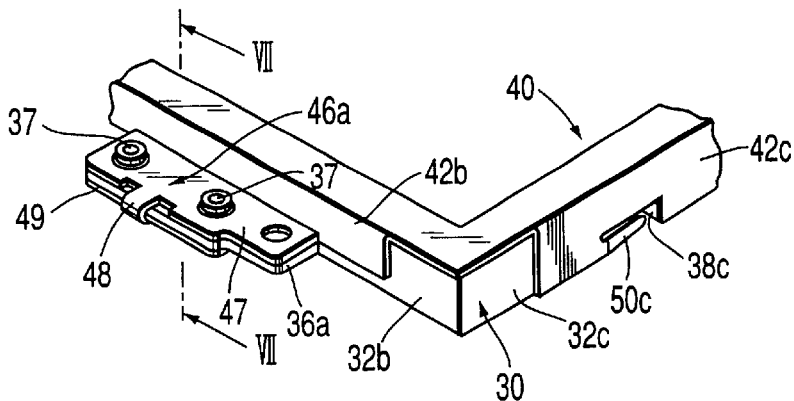
FIG. 6 is an enlarged perspective view showing the engaging portions and the fitting portions of the frame and the bezel of the display device.
Figure 7:
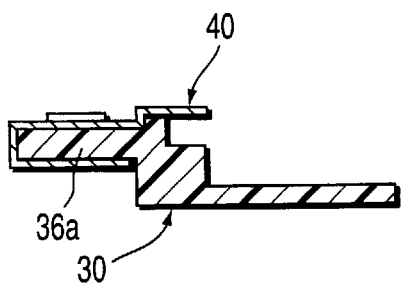
FIG. 7 is a sectional view taken along line VII—VII of FIG. 6.

In joining the bezel 40 to the frame 30, the base portions 47 of the engaging portions 46a and 46b are put on their corresponding projections 36a and 36b, and the tapped holes 37 of the projections are aligned with the through holes 51 and 52, as shown in FIGS. 6 and 7. Further, each turn-up portion 49 is turned up at 180° around the junction 48 so that it faces the back surface of its corresponding projection 36a or 36b, and the tapped holes 37 of the projection and the through holes 51 and 52 of the turn-up portion are aligned with one another.

Thus, the engaging portions 46a and 46b are caused to engage their corresponding projections 36a and 36b of the frame 30 in a manner such that the projections 36a and 36b are vertically clamped between their respective base portions 47 and turn-up portions 49.

As shown in FIGS. 2, 5, 6 and 8, moreover, the bezel 40 is partially notched so that fitting claws 50c and 50d are formed on the short side walls 42c and 42d of the bezel 40, respectively. Corresponding to the fitting claws 50c and 50d of the bezel 40, furthermore, recesses 38c and 38d are formed in the short side walls 32c and 32d of the frame 30, respectively.

Figure 8:
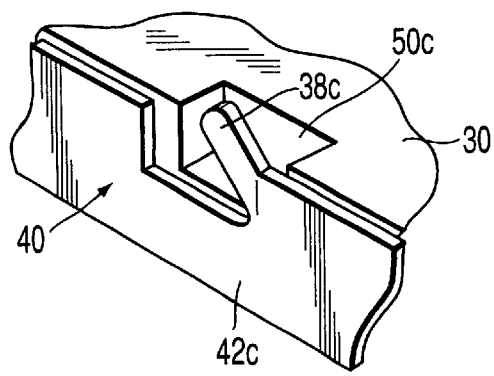
FIG. 8 is an enlarged perspective view showing the fitting portions of the frame and the bezel of the display device.

In joining the bezel 40 to the frame 30, the fitting claws 50c and 50d of the bezel 40 are bent inward and fitted into the recesses 38c and 38d of the frame 30, respectively, as shown in FIGS. 6 and 8.

According to the liquid crystal display device constructed in this manner, the frame 30 and the bezel 40 are joined together in a manner such that the lugs 34a and 34b on the one long side are fitted in the fitting holes 44a and 44b, respectively, and that the projections 36a and 36b on the other long side are in engagement with the engaging portions 46a and 46b, respectively. Thus, the frame 30 and the bezel 40 can be securely fixed to each other without using a tape or the like, so that the liquid crystal display device can be assembled with improved efficiency.

Further, the frame and the bezel are fixed to each other in a manner such that the fitting claws 50c and 50d on the side walls 42c and 42d are bent and fitted into the recesses 38c and 38d of the frame 30, respectively. Thus, screwing spots can be reduced, so that the efficiency of assembly operation can be improved further.

In disengaging the frame 30 and the bezel 40 from each other, on the other hand, it is hard to turn back the engaging portions 46a and 46b without breaking them, since the bezel is formed of a metal sheet of 0.2 mm. According to the liquid crystal display device with the aforementioned construction, however, the engaging portions 46a and 46b of the metallic bezel 40 can be disengaged from the projections 36a and 36b of the resin frame 30 without being straightened as the fitting on the lower side, that is, the fitting between the lugs 34a and 34b and the fitting holes 44a and 44b and the fitting between the fitting claws 50c and 50d and the recesses 38c and 38d, are canceled. In consequence, the bezel 40 can be readily removed from the frame 30, so that repairs can be carried out with ease.

The minimum thickness of the frame 30 is 3.7 mm, the thickness of the bezel 40 is 0.2 mm, and the minimum thickness of the whole liquid crystal display device is 4.3 mm. Accordingly, the overall size of the display device can be approximated to the size of the liquid crystal display panel 10 as a simple with the diagonal dimension of 11.3 inches. Since its overall thickness can be lessened, moreover, the liquid crystal display device can be reduced in weight and thickness.

It is to be understood that the present invention is not limited to the embodiment described above, and that various changes and modifications may be effected therein by one skilled in the art without departing from the scope or spirit of the invention. For example, the engaging portions and the fitting portions can be increased in number as required, and the respective shapes of the engaging portions, fitting portions, projections, lugs, fitting claws, etc. may be changed variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat display device comprising:
    a substantially rectangular flat display panel having an effective display region;
    a substantially rectangular frame carrying the flat display panel thereon; and
    a bezel in the form of a substantially rectangular frame having an opening corresponding to the effective display region of the flat display panel and attached to the frame so that the display panel is held between the frame and the bezel,
    the frame having two opposite side walls, an engaging projection on one side wall, and a fitting lug on the other side wall, and
    the bezel having an engaging portion engaging the engaging projection in a bent state and a fitting hole fitted with the fitting lug
    wherein the projection of the frame is in the form of a plate protruding outward from the frame, and the engaging portion of the bezel has a plate shape projection from the bezel and corresponding to the projection of the frame and is bent so as to clamp the projection from both sides, and
    wherein the engaging portion integrally includes a base portion opposed to one surface of the projection and a turn up portion coupled to the base portion by means of an elongate junction and opposed to the other surface of the projection.

2. A flat display device according to claim 1, wherein the frame has two other side walls extending across the two side walls and recesses formed individually in the other side walls, and the bezel has two side walls opposed individually to the other side walls of the frame and fitting claws formed individually on the side walls and being bent to be fitted individually into the recesses.

3. A flat display device comprising:
    a substantially rectangular flat display panel having an effective display region;
    a substantially rectangular surface light source unit opposed to the flat display panel;
    a substantially rectangular frame carrying the flat display panel and the surface light source unit thereon; and
    a bezel in the form of a substantially rectangular frame having an opening corresponding to the effective display region of the flat display panel and attached to the frame so that the display panel and the light source unit are held between and the bezel,
    the frame having two opposite side walls, an engaging projection on one side wall, and a fitting lug on the other side wall, and
    the bezel having an engaging portion engaging the engaging projection in a bent state and a fitting hole fitted with the fitting lug
    wherein the projection of the frame is in the form of a plate protruding outward from the frame, and the engaging portion of the bezel has a plate shape projecting from the bezel and corresponding to the projection of the frame and is bent so as to clamp the projection from both sides, and
    wherein the engaging portion integrally includes a base portion opposed to one surface of the projection and a turn up portion coupled to the base portion by means of an elongate junction and opposed to the other surface of the projection.

4. A flat display device according to claim 3, wherein the frame has two other side walls extending across the two side walls and recesses formed individually in the other side walls, and the bezel has two side walls opposed individually to the other side walls of the frame and fitting claws formed individually on the side walls and being bent to be fitted individually into the recesses.

* * * * *